US012165499B2

(12) United States Patent
Beale et al.

(10) Patent No.: US 12,165,499 B2
(45) Date of Patent: Dec. 10, 2024

(54) SYSTEMS AND METHODS FOR BUILDING AND USING A FALSE ALARM PREDICTING MODEL TO DETERMINE WHETHER TO ALERT A USER AND/OR RELEVANT AUTHORITIES ABOUT AN ALARM SIGNAL FROM A SECURITY SYSTEM

(71) Applicant: Ademco Inc., Golden Valley, MN (US)

(72) Inventors: Brian Beale, Woodbury, MN (US); Sharath Venkatesha, Minnetonka, MN (US); Soumitri Kolavennu, Blaine, MN (US); Nathaniel Kraft, Minnetonka, MN (US)

(73) Assignee: Ademco Inc., Golden Valley, MN (US)

( * ) Notice: Subject to any disclaimer, the term of this patent is extended or adjusted under 35 U.S.C. 154(b) by 0 days.

(21) Appl. No.: 18/354,062

(22) Filed: Jul. 18, 2023

(65) Prior Publication Data

US 2023/0360517 A1 Nov. 9, 2023

Related U.S. Application Data

(63) Continuation of application No. 17/674,271, filed on Feb. 17, 2022, now Pat. No. 11,776,387, which is a (Continued)

(51) Int. Cl.

| | |
|---|---|
| ***G08B 29/00*** | (2006.01) |
| ***G08B 23/00*** | (2006.01) |

(Continued)

(52) U.S. Cl.

CPC ........... *G08B 29/188* (2013.01); *G08B 23/00* (2013.01); *G08B 25/001* (2013.01); *G08B 29/02* (2013.01); *G08B 29/26* (2013.01)

(58) Field of Classification Search

CPC .... G08B 29/188; G08B 23/00; G08B 25/001; G08B 29/02; G08B 29/26; G08B 25/14; G08B 29/186; G08B 31/00

See application file for complete search history.

(56) References Cited

U.S. PATENT DOCUMENTS

| | | | |
|---|---|---|---|
| 4,191,953 | A | 3/1980 | Woode |
| 4,527,151 | A | 7/1985 | Byrne |

(Continued)

FOREIGN PATENT DOCUMENTS

| | | | |
|---|---|---|---|
| CA | 2351138 | A1 | 12/2002 |
| CN | 1501043 | A | 6/2004 |

(Continued)

OTHER PUBLICATIONS

Stanley, "SU 100 Motion Sensor", dated 2000, 2 pgs.

(Continued)

*Primary Examiner* — Toan N Pham

(74) *Attorney, Agent, or Firm* — Greenberg Traurig, LLP; David J. Dykeman; Nicholas Martin

(57) ABSTRACT

Systems and methods for building and using a false alarm predicting model to determine whether to alert a user and/or relevant authorities about an alarm signal from a security system are provided. Such systems and methods can include a learning module receiving the alarm signal and additional information associated with the alarm signal, using the false alarm predicting model to process a combination of the alarm signal and the additional information to determine whether the combination represents a false alarm or a valid alarm, and transmitting a status signal indicative of whether the combination represents the false alarm or the valid alarm to an automated dispatcher module, and the automated dispatcher module using the status signal to automatically (Continued)

determine whether to alert the user and/or the relevant authorities about the alarm signal.

20 Claims, 6 Drawing Sheets

Related U.S. Application Data continuation of application No. 16/942,709, filed on Jul. 29, 2020, now Pat. No. 11,282,374, which is a continuation of application No. 16/543,786, filed on Aug. 19, 2019, now Pat. No. 10,762,773.

(51) Int. Cl.
*G08B 25/00* (2006.01)
*G08B 29/02* (2006.01)
*G08B 29/18* (2006.01)
*G08B 29/26* (2006.01)

(56) References Cited

U.S. PATENT DOCUMENTS 4,551,711 A 11/1985 Akiyama et al.
5,026,990 A 6/1991 Marman et al.
5,276,427 A 1/1994 Peterson
5,287,111 A 2/1994 Shpater
5,331,308 A 7/1994 Buccola et al.
5,758,324 A 5/1998 Hartman et al.
5,781,108 A 7/1998 Jacob et al.
5,966,090 A 10/1999 Mcewan
5,986,357 A 11/1999 Myron et al.
6,353,385 B1 3/2002 Molini et al.
6,377,174 B1 4/2002 Siegwart et al.
6,624,750 B1 9/2003 Marman et al.
6,778,092 B2 8/2004 Braune
6,943,685 B2 9/2005 Seo
6,946,959 B2 9/2005 Wang
6,992,577 B2 1/2006 Tsuji et al.
7,042,349 B2 5/2006 Bergman et al.
7,079,030 B2 7/2006 Tsuji
7,084,761 B2 8/2006 Izumi et al.
7,274,387 B2 9/2007 Gupta et al.
7,327,253 B2 2/2008 Whitten et al.
7,463,182 B1 12/2008 Morinaga et al.
7,617,327 B1 11/2009 Allam et al.
7,636,039 B2 12/2009 Babich
7,679,509 B2 3/2010 Royer
7,796,033 B2 9/2010 Green et al.
7,873,868 B1 1/2011 Heideman et al.
8,102,261 B2 1/2012 Wu
8,179,256 B2 5/2012 Crisp et al.
8,432,448 B2 4/2013 Hassapis et al.
8,509,815 B1 8/2013 Shojayi et al.
8,519,883 B2 8/2013 Drake et al.
8,565,125 B2 10/2013 Blum et al.
8,626,210 B2 1/2014 Hicks, III
9,013,294 B1 4/2015 Trundle
9,125,144 B1 9/2015 Orbach et al.
9,189,751 B2 11/2015 Matsuoka et al.
9,224,285 B1 12/2015 Trundle
9,237,315 B2 1/2016 Naylor et al.
9,498,885 B2 11/2016 Scott et al.
9,633,547 B2 4/2017 Farrand et al.
9,655,217 B2 5/2017 Recker et al.
9,786,158 B2 10/2017 Angel et al.
9,940,797 B2 4/2018 Lamb et al.
10,147,307 B2 12/2018 Patterson et al.
10,176,706 B2 1/2019 Angel et al.
10,380,521 B2 8/2019 Kapuschat et al.
10,930,122 B1 2/2021 Zakaria et al.
11,776,387 B2 * 10/2023 Beale .................... G08B 29/188 340/568.2
2002/0175815 A1 11/2002 Baldwin
2003/0030557 A1 2/2003 Progovac et al.
2004/0113778 A1 6/2004 Script et al.
2004/0119778 A1 6/2004 Naito
2004/0186739 A1 9/2004 Bolles et al.
2005/0030179 A1 2/2005 Script et al.
2005/0128067 A1 6/2005 Zakrewski
2005/0203647 A1 9/2005 Landry et al.
2005/0207105 A1 9/2005 Davies
2006/0073822 A1 4/2006 Orton et al.
2006/0103520 A1 5/2006 Clark
2006/0125621 A1 6/2006 Babich
2006/0139164 A1 6/2006 Tsuji
2006/0266944 A1 11/2006 Chi et al.
2007/0018106 A1 1/2007 Zhevelev et al.
2007/0115164 A1 5/2007 Wu et al.
2007/0176765 A1 8/2007 Babich et al.
2007/0210909 A1 9/2007 Addy
2007/0252720 A1 11/2007 Hughes et al.
2007/0253461 A1 11/2007 Billington et al.
2008/0084292 A1 4/2008 Dipoala
2008/0100498 A1 5/2008 Fullerton et al.
2008/0184059 A1 7/2008 Chen
2008/0204190 A1 8/2008 Cohn et al.
2008/0218339 A1 9/2008 Royer
2008/0218340 A1 9/2008 Royer
2008/0310254 A1 12/2008 Piel et al.
2008/0316025 A1 12/2008 Cobbinah et al.
2008/0316309 A1 12/2008 Roper
2009/0051529 A1 2/2009 Tsuji
2009/0079563 A1 3/2009 Tsuji
2009/0167538 A1 7/2009 Merritt et al.
2009/0240974 A1 9/2009 Baba et al.
2009/0273463 A1 11/2009 Morwood et al.
2009/0322527 A1 12/2009 Crisp et al.
2010/0013636 A1 1/2010 Wu
2010/0045471 A1 2/2010 Meyers
2010/0201527 A1 8/2010 Jensen et al.
2010/0201787 A1 8/2010 Zehavi
2010/0242084 A1 9/2010 Keeni
2010/0271198 A1 10/2010 Boling et al.
2010/0277300 A1 11/2010 Cohn et al.
2010/0313064 A1 12/2010 Boctor et al.
2010/0328056 A1 12/2010 Merkel et al.
2011/0046698 A1 2/2011 Kivi et al.
2011/0047253 A1 2/2011 Bhat
2011/0065414 A1 3/2011 Frenette et al.
2011/0102171 A1 5/2011 Raji et al.
2011/0143774 A1 6/2011 Mcnamara et al.
2011/0169628 A1 7/2011 Elliot et al.
2011/0254681 A1 10/2011 Perkinson et al.
2011/0261680 A1 10/2011 Boudreaux et al.
2012/0013739 A1 1/2012 Peterson et al.
2012/0047494 A1 2/2012 Unrein et al.
2012/0139718 A1 6/2012 Foisy et al.
2012/0154138 A1 6/2012 Cohn et al.
2012/0161976 A1 6/2012 Xie et al.
2012/0188072 A1 7/2012 Dawes et al.
2012/0188081 A1 7/2012 Van Katwijk
2012/0319842 A1 12/2012 Amis
2013/0113397 A1 5/2013 Salter et al.
2013/0179625 A1 7/2013 Stanton et al.
2013/0189946 A1 7/2013 Swanson
2013/0240739 A1 9/2013 Shpater
2013/0246850 A1 9/2013 Gelter et al.
2013/0249688 A1 9/2013 Nguyen et al.
2013/0285799 A1 10/2013 Probin et al.
2013/0300566 A1 11/2013 Kumfer et al.
2014/0266699 A1 9/2014 Poder et al.
2014/0359101 A1 12/2014 Dawes et al.
2015/0061859 A1 3/2015 Matsuoka et al.
2015/0070205 A1 3/2015 Chang et al.
2015/0212205 A1 7/2015 Shpater
2015/0309167 A1 10/2015 Shikatani et al.
2015/0369618 A1 12/2015 Barnard et al.
2016/0226892 A1 8/2016 Sen et al.
2016/0240056 A1 8/2016 Chen
2017/0103648 A1 4/2017 Bodurka
2017/0108885 A1 4/2017 Meganathan et al.
2017/0206771 A1 7/2017 Hermann

(56) References Cited

U.S. PATENT DOCUMENTS

| | | | |
|---|---|---|---|
| 2018/0159593 | A1 | 6/2018 | Bogdan et al. |
| 2018/0315301 | A1 | 11/2018 | Subramanian et al. |
| 2019/0035242 | A1 | 1/2019 | Vazirani |
| 2019/0086266 | A1 | 3/2019 | Lin et al. |
| 2020/0250945 | A1 | 8/2020 | Liiv et al. |

FOREIGN PATENT DOCUMENTS

| | | | |
|---|---|---|---|
| CN | 1612542 | A | 5/2005 |
| CN | 101446965 | A | 6/2009 |
| DE | 202011004996 | U1 | 3/2012 |
| EP | 2260563 | B1 | 10/2011 |
| EP | 3355289 | A1 | 8/2018 |
| ES | 1006935 | U | 1/1989 |
| GB | 2078413 | A | 1/1982 |
| JP | 2000338231 | A | 12/2000 |
| JP | 2003317178 | A | 11/2003 |
| JP | 2011028574 | A | 2/2011 |
| KR | 1020060073055 | A | 6/2006 |
| WO | 2016109838 | A1 | 7/2016 |

OTHER PUBLICATIONS

"How Terminal Services Works," Technet.microsoft.com, Updated Mar. 28, 2003, downloaded from http://technet.microsoft.com/en-us/library/cc755399(d=printer,v=ws.1 0).aspx on Nov. 5, 2014, 10 pgs.

Rytec Corporation "Motion Detector—Installation and Operating Instructions", Revision: Jan. 21, 2003, 10 pgs.

Mark Kretschmar, Lion Precision Sensors, "Capacitive Sensor Operation Part 1: The Basics", May 1, 2009, 6 pgs.

Mark Kretschmar, Lion Precision Sensors, "Capacitive Sensor Operation Part 2: System Optimization", Jun. 1, 2009, 5 pgs.

Thomas Perme et al., "Capacitive Touch Using Only an ADC ("CVD") AN1298", Microchip Technology Inc., DS01298A, Mar. 26, 2009, 4 pgs.

Atmel, "Proximity Design Guide, Application Note QTAN0087", 10760A-AT42, Nov. 2011, 12 pgs.

Atmel, "QTouch 12-channel Touch Sensor IC, AT42QT2120 [Preliminary]", 9634AX-AT42, Nov. 2011, 42 pgs.

Atmel Delivers QTouch Capacitive Touch Controller, downloaded from http://sensorsmag.com/electronics-computers/news/atmel-delivers-qtouch-capacitive-touch-control . . . on Nov. 16, 2011, 2 pgs.

Cypress Semiconductor Corporation, "Cypress Perform, PSoC Programmable System-on-Chip", Document No. 001-67345, Rev. *A, Revised May 13, 2011, 47 pgs.

Cypress Semiconductor, "Cypress Perform, CY3235-ProxDet, CapSense Proximity Detection Demonstration Kit Guide", Doc. #: 001-67986 Rev. *B, Oct. 14, 2011, 34 pgs.

NXP Semiconductors, "PCA8886—Dual channel capacitive proximity switch with auto-calibration and large voltage operating range", Rev. 1—Nov. 23, 2011, 26 pgs.

United States Nuclear Regulatory Commission, Office of Nuclear Security and Incident Response, "Intrusion Detection Systems and Subsystems", Technical Information for NRG Licensees, Published Mar. 2011, 208 pgs.

Semtech Launches Smart Proximity Sensor, downloaded from http://sensorsmag.com/electronice-computers/consumer/news/semtech-launches-smart-proximity-sensor-10190?print=1, dated Jun. 25, 2012, 3 pgs.

Honeywell Intrusion and Communications—AlarmNet Services, http://www.security.honeywell.com/hsc/solutions/alarmnet/index.html, downloaded on Mar. 11, 2013, 2 pgs.

Honeywell Security and Communications UK C081 DCM, downloaded from http://www.security.honeywell.com1uk/intruder/products/co/gxacc/ac/213273.html on Mar. 11, 2013, 1 pg.

Honeywell Intrusion and Communications—iGSMV, downloaded from http://www.security. honeywell .com/hsc/products/alarm/re/gsm/304824.html on Mar. 11, 2013, 3 pgs.

Honeywell Intrusion and Communications—7845GSM, downloaded from http://www.security.honeywell.com/canada/products/alann/re/gsm/103665.html on Mar. 11, 2013, 2 pgs.

Essential Video Analytics 6.30, Bosch Security Systems 2017, V3, Feb. 16, 2017, 3 pgs.

T.K. Hareendran, HB100 Microwave Motion Sensor—An Introduction, Electro Schematics, downloaded from http://electroschematics.com/11926/hb100-microwave-mot . . . on Aug. 14, 2017, 5 pgs.

Partial Search Report for EP Application No. 20178346.1 dated Nov. 11, 2020, 14 pgs.

Honeywell Galaxy Dimension, Integrated Intrusion and door control panel range, dated Oct. 2012, 3 pgs.

Partial Search Report for EP Application No. 23167166.0 dated Jul. 14, 2023, 17 pgs.

* cited by examiner

SYSTEMS AND METHODS FOR BUILDING AND USING A FALSE ALARM PREDICTING MODEL TO DETERMINE WHETHER TO ALERT A USER AND/OR RELEVANT AUTHORITIES ABOUT AN ALARM SIGNAL FROM A SECURITY SYSTEM

RELATED APPLICATIONS

This application is a continuation of U.S. patent application Ser. No. 17/674,271, filed on Feb. 17, 2022, now U.S. Pat. No. 11,776,387, which is a continuation of U.S. patent application Ser. No. 16/942,709, filed on Jul. 29, 2020, now U.S. Pat. No. 11,282,374, which is a continuation of U.S. patent application Ser. No. 16/543,786, filed on Aug. 19, 2019, now U.S. Pat. No. 10,762,773, the contents of each are hereby incorporated by reference.

TECHNICAL FIELD

The present invention relates generally to security systems. More particularly, the present invention relates to systems and methods for building and using a false alarm predicting model to determine whether to alert a user and/or relevant authorities about an alarm signal from a security system.

BACKGROUND

Known security systems utilize a cloud server to process alarm signals and distribute the alarm signals to a central monitoring station for review and transmission of alert signals to users and/or relevant authorities when needed. However, known security systems often produce a high number of false alarms that consume bandwidth when transmitted and must be screened by live technicians at the central monitoring station, thereby greatly increasing costs associated with operating the central monitoring station.

For example, when the cloud server receives an alarm signal from a security system, the cloud server identifies the central monitoring station associated with the security system and transmits an unfiltered version of the alarm signal to the central monitoring station. Then, the central monitoring station processes the alarm signal by placing the alarm signal in a queue and retrieving associated customer information. When an operator becomes available, the central monitoring station removes the alarm signal and the associated customer information from the queue and presents the alarm signal and the associated customer information to the operator for review. In an attempt to identify any false alarms, the operator may contact a user of the security system via a primary phone number and/or a backup phone number to solicit user input indicative of whether the alarm signal is a valid alarm. Then, the operator will contact the relevant authorities when he or she confirms that the alarm signal likely corresponds to the valid alarm or fails to confirm that the alarm signal corresponds to a false alarm.

Unfortunately, the above-described systems and methods consume more bandwidth than is necessary for valid alarms and a lot of time that the operator could otherwise spend addressing the alarm signals known to be valid. Therefore, there is a need and an opportunity for improved systems and methods.

DETAILED DESCRIPTION

Figure 1:
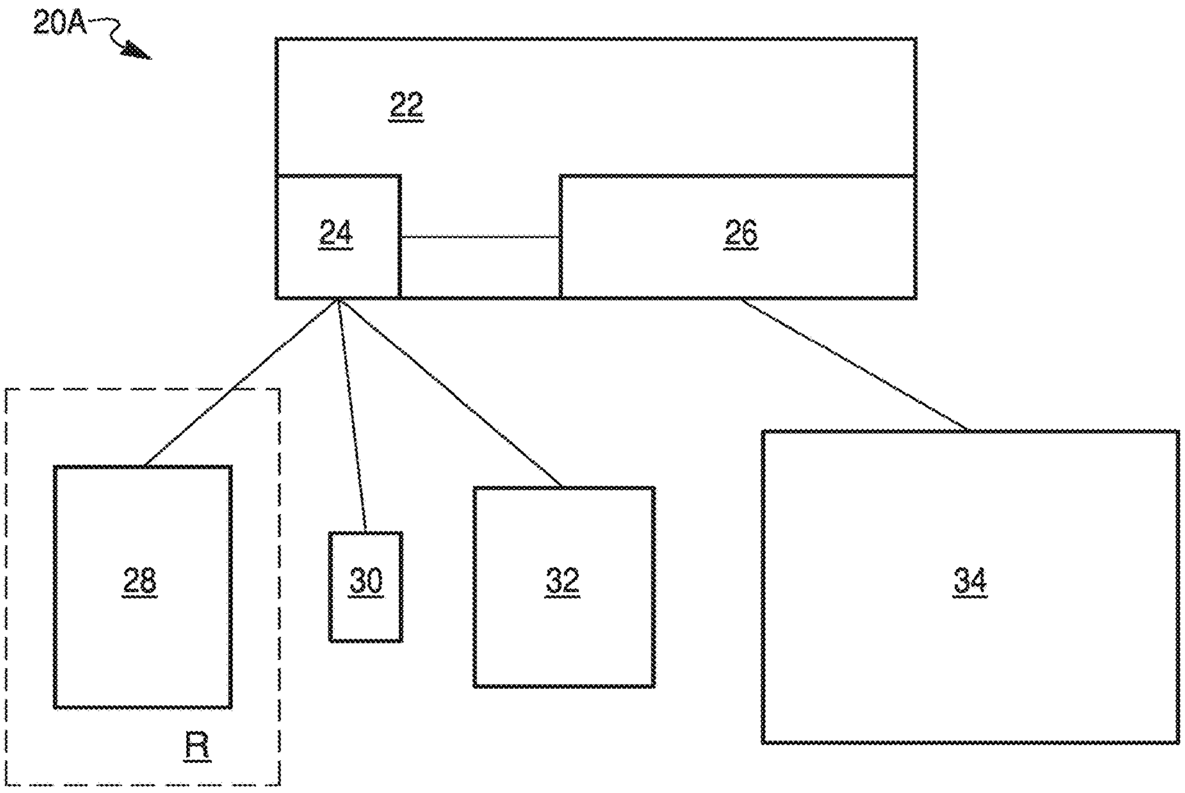
FIG. 1 is a block diagram of a system in accordance with disclosed embodiments.

While this invention is susceptible of an embodiment in many different forms, specific embodiments thereof will be described herein in detail with the understanding that the present disclosure is to be considered as an exemplification of the principles of the invention. It is not intended to limit the invention to the specific illustrated embodiments.

Embodiments disclosed herein can include systems and methods that use artificial intelligence and machine learning to determine what security actions to execute and when to execute those security actions responsive to an alarm signal from a security system by fusing security system sensor data, situational awareness/contextual data, user preference data, and the like. For example, systems and methods disclosed herein can determine whether to push a security notification to a mobile application of a user, call or refrain from calling the user via a primary phone number and/or a backup phone number, and/or call or dispatch relevant authorities to a secured area.

In accordance with disclosed embodiments, systems and methods disclosed herein can build and use a false alarm predicting model to process alarm signals from the security system to (1) maximize a likelihood that false alarms are identified before otherwise being transmitted to the user and/or the relevant authorities and (2) enable use of an automated dispatcher module to directly report the alarm signals to the user and/or the relevant authorities. For example, a learning module can use the false alarm predicting model to process an alarm signal from the security system and, responsive thereto, generate a status signal. The automated dispatcher module can process the status signal to automatically determine whether to alert the user and/or the relevant authorities about the alarm signal.

In some embodiments, the false alarm predicting model can be managed by the learning module. For example, in some embodiments, the learning module can receive the alarm signal from the security system and additional information associated with the alarm signal, use the false alarm predicting model to process a combination of the alarm signal and the additional information to determine whether the combination represents a false alarm or a valid alarm, and transmit the status signal indicative of whether the combination represents the false alarm or the valid alarm to the automated dispatcher module. Then, the automated dispatcher module can use the status signal to automatically determine whether to alert the user and/or the relevant authorities about the alarm signal.

In some embodiments, all or parts of the automated dispatcher module can be co-located with the learning module on a cloud server and/or a control panel of the security system as either a single integrated processing module or multiple distinct processing modules. However, in some embodiments, all or parts of the automated dispatcher module and the learning module can be located on separate components that are in communication with each other. For example, all or parts of the learning module can be located on the control panel, and all or parts of the automated dispatcher module can be located on the cloud server. Similarly, all or parts of the learning module can be located on the cloud server, and all or parts of the automated dispatcher module can be located on the control panel, or all or parts of the learning module can be located on the cloud server, and all or parts of the automated dispatcher module can be located on another server that is separate and distinct from the cloud server and the control panel.

In any embodiment, each of the automated dispatcher module and the learning module can include a respective transceiver device and a respective memory device, each of which can be in communication with respective control circuitry, one or more respective programmable processors, and respective executable control software as would be understood by one of ordinary skill in the art. In some embodiments, the respective executable control software of each of the automated dispatcher module and the learning module can be stored on a transitory or non-transitory computer readable medium, including, but not limited to local computer memory, RAM, optical storage media, magnetic storage media, flash memory, and the like, and some or all of the respective control circuitry, the respective programmable processors, and the respective executable control software of each of the automated dispatcher module and the learning module can execute and control at least some of the methods described herein.

In accordance with disclosed embodiments, the security system can protect a geographic area, and in some embodiments, the additional information can include weather data from a time associated with the alarm signal, movement data associated with the geographic area during the time associated with the alarm signal, a location of users of the security system during the time associated with the alarm signal, and/or incident reports relevant to the geographic area.

In some embodiments, the learning module can transmit an identification of the security system to the automated dispatcher module with the status signal, and responsive to receiving the status signal, the automated dispatcher module can identify and execute a customized response protocol associated with the security system. Then, the automated dispatcher module can determine whether a response to executing the customized response protocol is indicative of the false alarm or the valid alarm to automatically determine whether to alert authorities about the alarm signal. For example, in some embodiments, the customized response protocol can include identifying one or more devices associated with the security system, such as a mobile device of the user, and transmitting a notification signal indicative of the alarm signal to those devices. In such embodiments, the response to executing the customized response protocol can include receiving user input indicating that the alarm signal is the false alarm or the valid alarm or failing to receive any user input. In such embodiments, the automated dispatcher module can treat failing to receive any user input as indicative of the alarm signal being the valid alarm.

In some embodiments, the learning module can build the false alarm predicting model by parsing historical data from a historical time period. For example, in some embodiments, the learning module can parse a plurality of alarm signals from the historical time period, a plurality of additional information from the historical time period, feedback signals indicative of a plurality of false alarms from the historical time period, and feedback signals indicative of a plurality of valid alarms from the historical time period to build the false alarm predicting model.

In some embodiments, the false alarm predicting model can include a global model used to assess a validity of alarms from a plurality of security systems that protect a plurality of geographic areas. In such embodiments, the plurality of alarm signals from the historical time period can originate from the plurality of security systems. With the global model, in some embodiments, the plurality of additional information from the historical time period can include the weather data from the time associated with one of the plurality of alarm signals from the historical time period, the movement data associated with one of the plurality of geographic areas during the time associated with the one of the plurality of alarm signals from the historical time period, the location of the users of one of the plurality of security systems during the time associated with the one of the plurality of alarm signals from the historical time period, and/or the incident reports relevant to one of the plurality of geographic areas.

Additionally or alternatively, in some embodiments, the false alarm predicting model can include a local model used to assess the validity of alarms from a single security system that protects a single geographic area. In such embodiments, the plurality of alarm signals from the historical time period can originate from the single security system. With the local model, in some embodiments, the plurality of additional information from the historical time period can include the weather data from the time associated with one of the plurality of alarm signals from the historical time period, the movement data associated with the single geographic area during the time associated with the one of the plurality of alarm signals from the historical time period, the location of the users of the single security system during the time associated with the one of the plurality of alarm signals from the historical time period, and/or the incident reports relevant to the single geographic area. However, with the local model, in some embodiments, the plurality of alarm signals from the historical time period can originate from the plurality of security systems as described in connection with the global model to initially build the local model, and in these embodiments, the local model can be updated based on events related to only the single security system.

In some embodiments, the user can define specific parameters that are used to build the local model. For example, in some embodiments, the user can define a length of the historical time period from which the plurality of alarm signals are used to build the false alarm predicting model. Additionally or alternatively, in some embodiments, the user can specify other customized parameters that limit which of the plurality of alarm signals from the historical time period are used to build the false alarm predicting model. For example, the other customized parameters can include a defined geographic area, a type of the plurality of alarm signals, or other parameters that can limit which of the plurality of alarm signals from the historical time period are used to build the false alarm predicting model. In embodiments in which the other customized parameters include the defined geographic area, the plurality of alarm signals from the historical time period used to build the false alarm predicting model can include only those of the plurality of alarm signals that occurred within the defined geographic area. Similarly, in embodiments in which the other customized parameters include the type of the plurality of alarm signals, the plurality of alarm signals from the historical time period used to build the false alarm predicting model can include only those of the plurality of alarm signals that match the type, for example, a window alarm signal or a door alarm signal.

Additionally or alternatively, in some embodiments, the learning module can build the false alarm predicting model by recognizing patterns in the historical data. For example, in some embodiments, the learning module can identify first patterns of the plurality of alarm signals from the historical time period and the plurality of additional information from the historical time period that result in the feedback signals indicative of the plurality of false alarms from the historical time period. Similarly, the learning module can recognize second patterns of the plurality of alarm signals from the historical time period and the plurality of additional information from the historical time period that result in the feedback signals indicative of the plurality of valid alarms from the historical time period. Then, in operation, the learning module can compare the combination of the alarm signal and the additional information to the first patterns and the second patterns to determine whether the combination represents the false alarm or the valid alarm.

Furthermore, in some embodiments, the learning module can update the false alarm predicting model for increased accuracy at future times. For example, in some embodiments, the learning module can receive feedback signals indicating whether the combination of the alarm signal and the additional information represents the false alarm or the valid alarm and can use those feedback signals to update the false alarm predicting model for the increased accuracy at the future times.

In some embodiments, any of the feedback signals described herein can include user input explicitly identifying the alarm signal or the plurality of alarm signals from the historical time period as the valid alarm or the false alarm. Additionally or alternatively, in some embodiments, any of the feedback signals described herein can include information related to actions executed in response to the alarm signal or the plurality of alarm signals from the historical time period that are indicative of the valid alarm or the false alarm.

For example, in some embodiments, the information related to the actions executed that are indicative of the false alarm can include a dispatcher of a central monitoring station refraining from notifying the authorities about the alarm signal or the plurality of alarm signals from the historical time period or a report from the authorities identifying the false alarm after surveying the geographic area associated with the security system from which the alarm signal or the plurality of alarm signals from the historical time period originated. For example, the report from the authorities identifying the false alarm can include a description of the authorities walking around the geographic area and identifying nothing unusual or identifying a window or a door being open because of weather, not any presence of an intruder. Similarly, in some embodiments, the information related to the actions executed that are indicative of the valid alarm can include the dispatcher of the central monitoring station notifying the authorities about the alarm signal or the plurality of alarm signals from the historical time period or a report from the authorities identifying the valid alarm after surveying the geographic area associated with the security system from which the alarm signal or the plurality of alarm signals from the historical time period originated.

The learning module can receive the information related to the actions executed that are indicative of the false alarm or the valid alarm in a variety of ways. For example, in some embodiments, the learning module can automatically receive and parse the information related to the actions executed that are indicative of the false alarm or the valid alarm directly or via another module. Additionally or alternatively, in some embodiments, the learning module can manually receive the information related to the actions executed that are indicative of the false alarm or the valid alarm from an operator of the central monitoring station, from the user, or the relevant authorities.

In some embodiments, the learning module can identify a score to determine whether the combination of the alarm signal and the additional information represents the false alarm or the valid alarm. For example, the score can be indicative of a likelihood or a probability that the combination represents the false alarm or the valid alarm. In some embodiments, the score can be based on an amount by which the alarm signal and the additional information match the plurality of alarm signals from the historical time period and the plurality of additional information from the historical time period, and in some embodiments, the alarm signal and/or the additional information can be automatically or manually assigned different weights for such a matching comparison. Furthermore, the learning module can transmit the score to the automated dispatcher module, for example, with the status signal. Then, the automated dispatcher module can compare the score to a threshold value to automatically determine whether to alert the user and/or the relevant authorities about the alarm signal. When such a comparison and/or the score indicates that the automated dispatcher module should alert the user and/or the relevant authorities, the automated dispatcher module can automatically alert the user and/or the relevant authorities about the alarm signal without human intervention.

In some embodiments, the score can include a simple numerical value that can be deciphered by a human user as indicating that the combination of the alarm signal and the additional information represents the false alarm or the valid alarm. However, in some embodiments, the score can include a range of values with a calculated distribution (e.g. Gaussian) that indicates whether the combination of the alarm signal and the additional information represents the false alarm or the valid alarm. In such embodiments, the automated dispatcher module can include a cumulative distribution function that indicates when the automated dispatcher module should alert the user and/or the authorities, and in some embodiments, a sensitivity of the automated dispatcher module to the score can be automatically or manually adjusted based on the user preference data, such as days of the week or when the user is out of town.

Additionally or alternatively, in some embodiments, the learning module can make a binary determination as to whether the combination of the alarm signal and the additional information represents the false alarm or the valid alarm and transmit the binary determination to the automated dispatcher module with the status signal. In such embodiments, when the binary determination indicates that the combination represents the valid alarm, the automated dispatcher module can automatically alert the user and/or the relevant authorities about the alarm signal without human intervention.

Various embodiments for how the automated dispatcher module can alert the user and/or the relevant authorities are contemplated. For example, in some embodiments, the automated dispatcher module can insert the notification signal indicative of the alarm signal and demographic data associated with the alarm signal directly into a dispatch system for the relevant authorities. In some embodiments, some or all of the demographic data can be retrieved from a database of the cloud server using an identifier of the security system that sent the alarm signal to the cloud server.

Additionally or alternatively, in some embodiments, some or all of the demographic data can be received from the security system with the alarm signal.

Additionally or alternatively, in some embodiments, the automated dispatcher module can call the user and/or the relevant authorities using voice emulation systems to report the alarm signal. Additionally or alternatively, in some embodiments, the automated dispatcher module can transmit an instruction signal to the mobile device of the user with instructions to contact the relevant authorities.

In some embodiments, the learning module can also transmit the status signal to a central monitoring station for processing thereof. For example, in some embodiments, the status signal can include the score that is indicative of the likelihood or the probability that the combination of the alarm signal and the additional information represents the false alarm or the valid alarm, and the central monitoring station can use the score to process and prioritize the alarm signal. For example, in some embodiments, when the score is indicative of a high likelihood of the alarm signal being the false alarm, the central monitoring station can deprioritize the alarm signal by, for example, placing the alarm signal at an end of a queue behind other alarm signals more likely to be valid. Additionally or alternatively, in some embodiments, a sensitivity of the central monitoring station to the score can be automatically or manually adjusted based on a price or level of service that the central monitoring station provides to the user.

Additionally or alternatively, in some embodiments, the learning module can transmit the alarm signal to the central monitoring station for processing thereof only when the status signal is indicative of a high likelihood of the alarm signal being the valid alarm. For example, in embodiments in which the learning module identifies the score that is indicative of the likelihood or the probability that the combination represents the false alarm or the valid alarm, the learning module can transmit the alarm signal to the central monitoring station when the score meets or exceeds the threshold value. However, in embodiments in which the learning module outputs the binary determination as to whether the combination of the alarm signal and the additional information represents the false alarm or the valid alarm, the learning module can transmit the alarm signal to the central monitoring station when the binary determination indicates that the alarm signal is the valid alarm.

FIG. 1, FIG. 2, FIG. 3, FIG. 4, and FIG. 5 are block diagrams of systems 20A, 20B, 20C, 20D, 20E in accordance with disclosed embodiments. As seen in FIG. 1, FIG. 2, FIG. 3, FIG. 4, and FIG. 5, the systems 20A, 20B, 20C, 20D, 20E can include a learning module 24, an automated dispatcher module 26, a security system 28 that protects a region R, a user device 30 associated with the security system 28, an external information source 32, and a dispatch system 34. As further seen in FIG. 1, FIG. 2, FIG. 3, FIG. 4, and FIG. 5, the user device 30 and the external information source 32 can communicate with the learning module 24, and the automated dispatcher module 26 can communicate with the dispatch system 34. In some embodiments, the user device 30 can include a mobile device of a user of the security system 28, and in some embodiments, the external information source 32 can include a weather service, an emergency services database, and the like.

In some embodiments, each of the learning module 24 and the automated dispatcher module 26 can include a respective transceiver device and a respective memory device in communication with respective control circuitry, one or more respective programmable processors, and respective executable control software as would be understood by one of ordinary skill in the art. In some embodiments, the respective executable control software of each of the learning module 24 and the automated dispatcher module 26 can be stored on a transitory or non-transitory computer readable medium, including, but not limited to local computer memory, RAM, optical storage media, magnetic storage media, flash memory, and the like, and some or all of the respective control circuitry, the respective programmable processors, and the respective executable control software of each of the learning module 24 and the automated dispatcher module 26 can execute and control at least some of the methods described herein.

Figure 2:
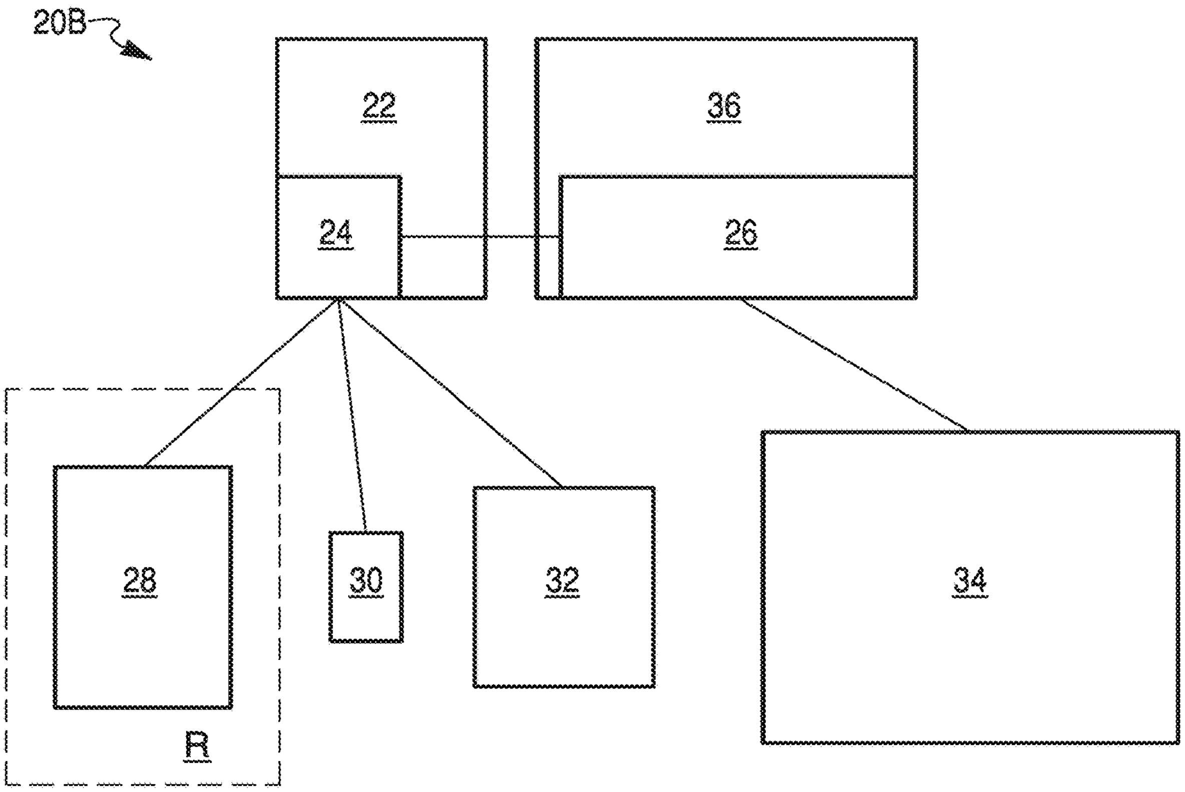
FIG. 2 is a block diagram of a system in accordance with disclosed embodiments.
Figure 3:
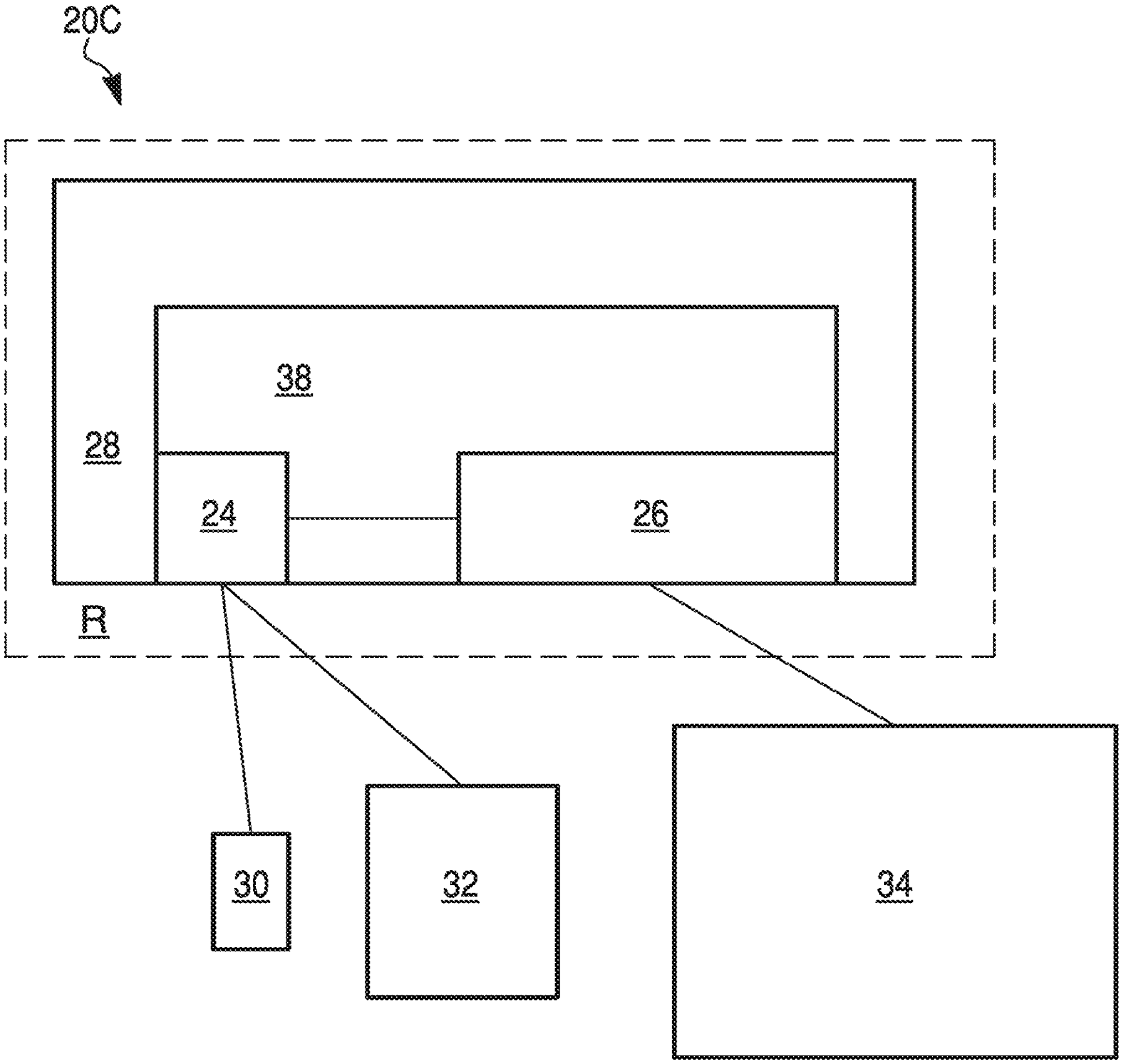
FIG. 3 is a block diagram of a system in accordance with disclosed embodiments.
Figure 4:
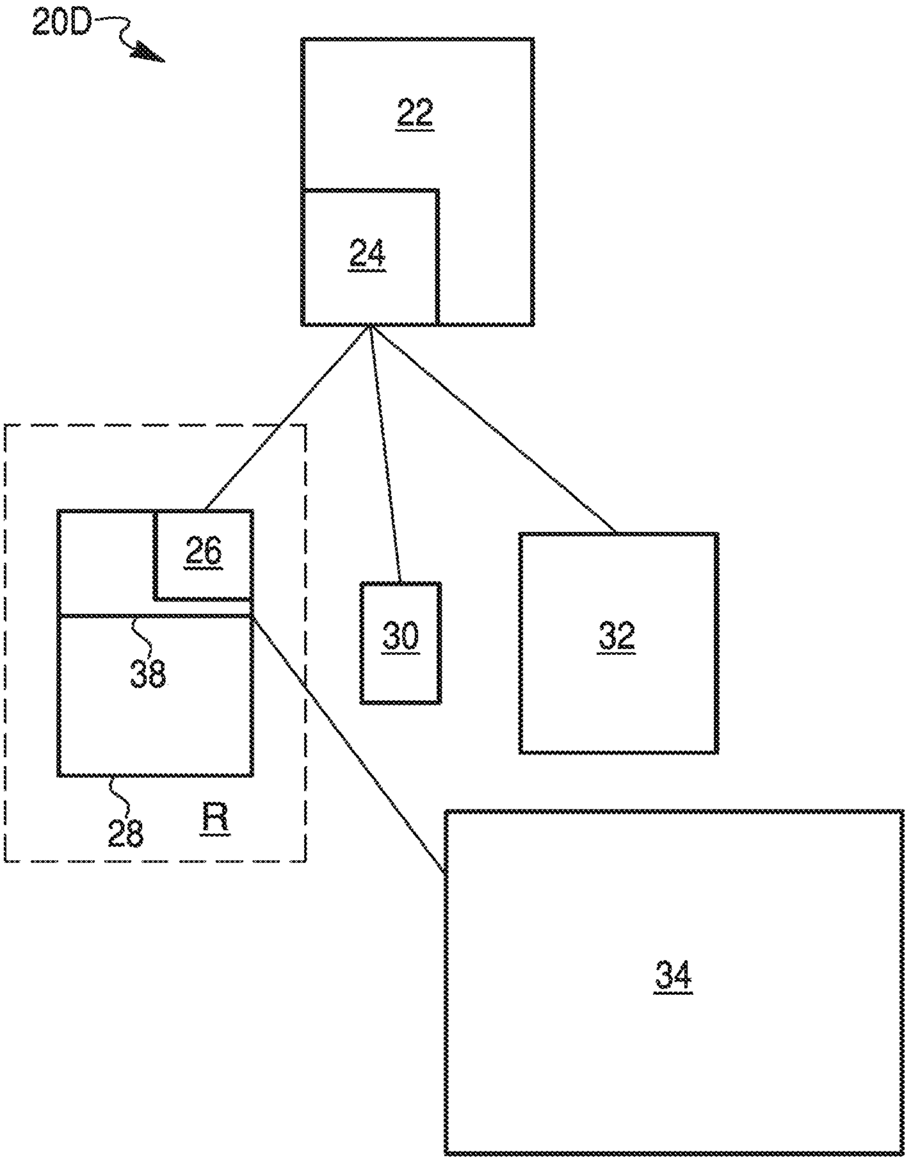
FIG. 4 is a block diagram of a system in accordance with disclosed embodiments.
Figure 5:
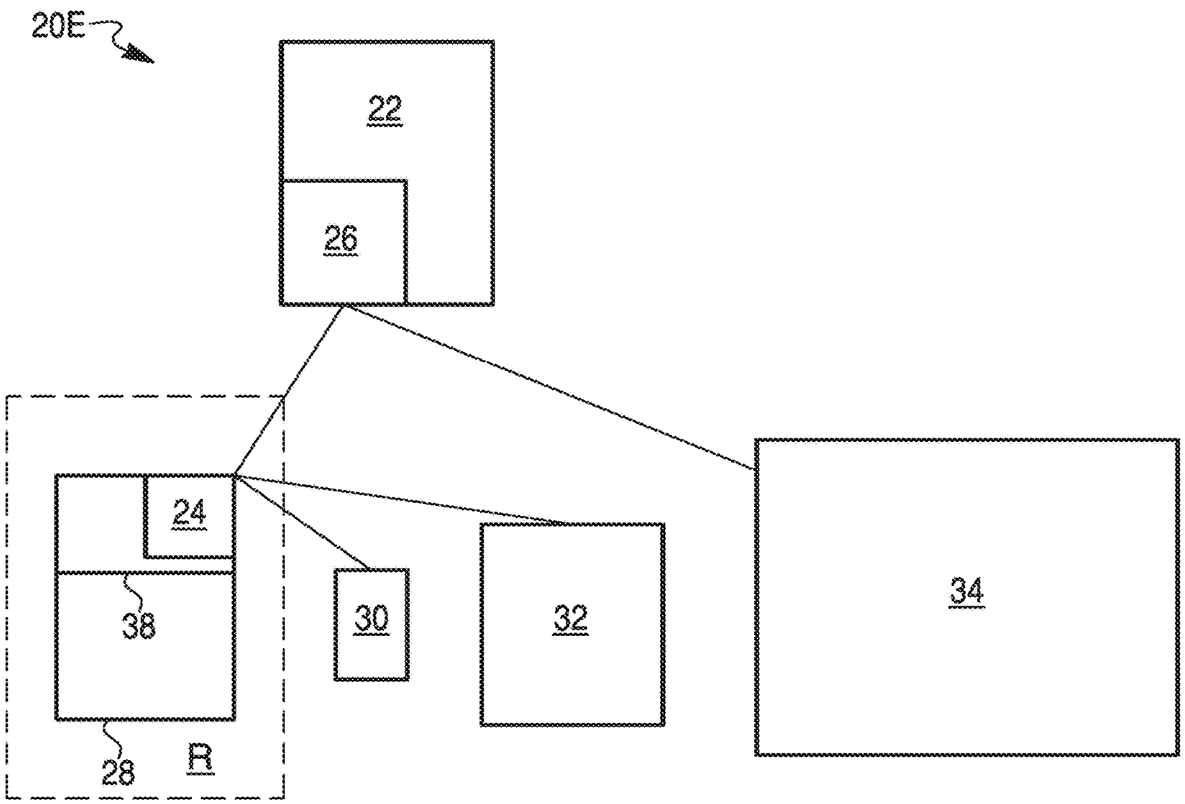
FIG. 5 is a block diagram of a system in accordance with disclosed embodiments.

As seen in FIG. 1, in some embodiments, both the learning module 24 and the automated dispatcher module 26 can be located on or be part of a cloud server 22. However, as seen in FIG. 2, in some embodiments, the automated dispatcher module 26 can be located on or be part of another server 36. Alternatively, as seen in FIG. 3, in some embodiments, both the learning module 24 and the automated dispatcher module 26 can be located on or be part of a control panel 22. However, as seen in FIG. 4, in some embodiments, the learning module 24 can be located or be part of the cloud server 22, and the automated dispatcher module 26 can be located on or be part of the control panel 38. Conversely, as seen in FIG. 5, in some embodiments, the automated dispatcher module 26 can be located on or be part of the cloud server 22, and the learning module 24 can be located on or be part of the control panel 38.

Figure 6:
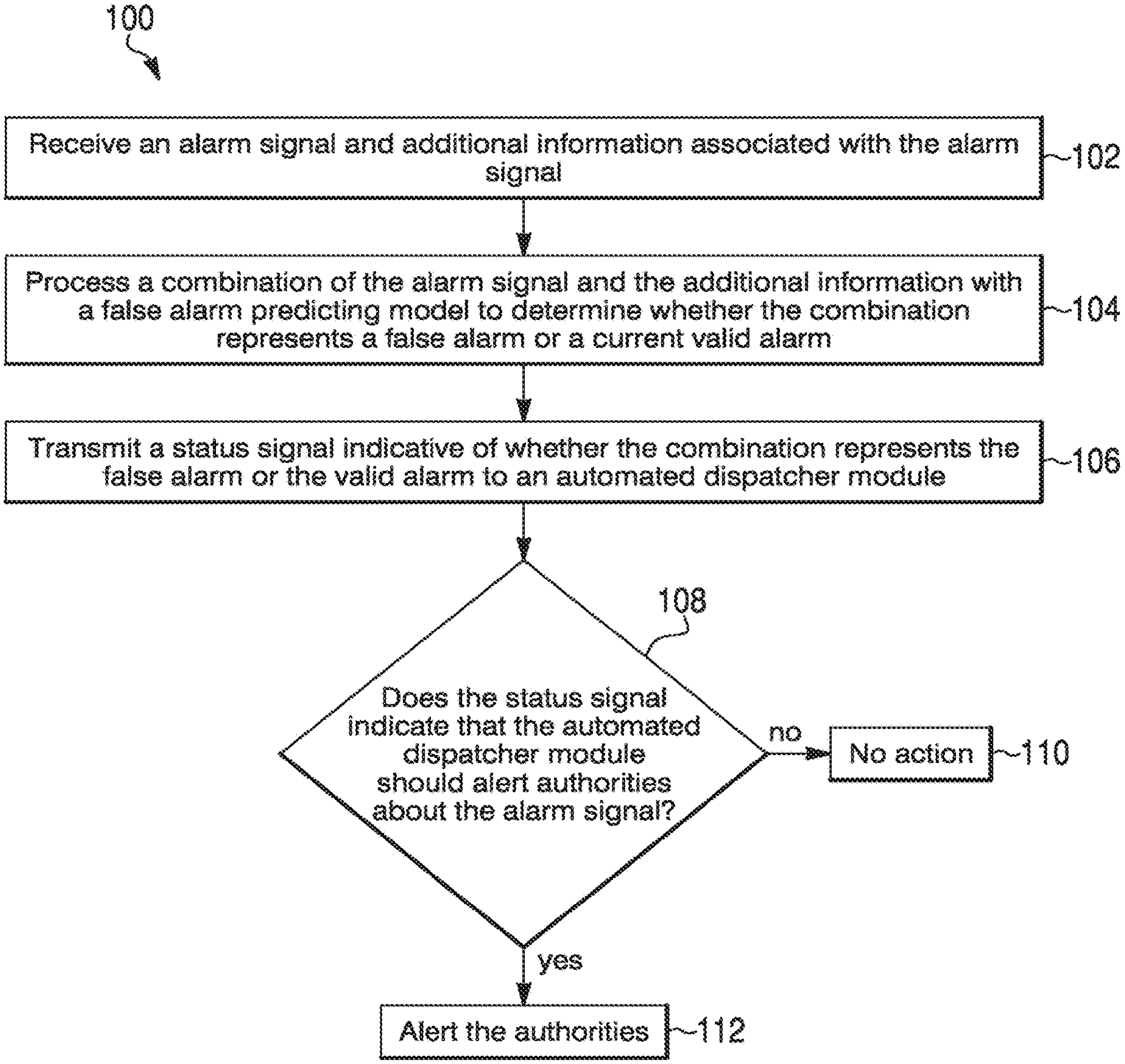
FIG. 6 is a flow diagram of a method in accordance with disclosed embodiments.

FIG. 6 is a flow diagram of a method 100 in accordance with disclosed embodiments. As seen in FIG. 6, the method 100 can include the learning module 24 receiving an alarm signal from the security system 28 and receiving additional information associated with the alarm signal from the security system 28 and/or from the external information source 32, as in 102. Then, the method 100 can include the learning module 24 using a false alarm predicting model to process a combination of the alarm signal and the additional information to determine whether the combination represents a false alarm or a valid alarm, as in 104, and transmitting a status signal indicative of whether the combination represents the false alarm or the valid alarm to the automated dispatcher module 26, as in 106.

After receiving the status signal, the method 100 can include the automated dispatcher module 26 determining whether the status signal indicates that the automated dispatcher module 26 should alert the user and/or relevant authorities about the alarm signal, as in 108. When the status signal fails to indicate that the automated dispatcher module 26 should alert the user and/or the relevant authorities, the method 100 can include taking no further action, as in 110. However, when the status signal indicates that the automated dispatcher module 26 should alert the user and/or the relevant authorities, the method 100 can include the automated dispatcher module 26 initiating an appropriate action as in 112, for example, by alerting the relevant authorities by inserting a notification signal indicative of the alarm signal and demographic data associated with the alarm signal directly into the dispatch system 34.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:

a learning module receiving an alarm signal and additional information associated with the alarm signal at a location, the alarm signal and additional information being received in accordance with parameters that filter a type and quantity of the additional information, wherein the additional information includes each of weather data from a time associated with the alarm signal and a location of one or more users of a security system, from which the alarm signal is received, during the time associated with the alarm signal;

the learning module using a false alarm predicting model to process a combination of the alarm signal and the additional information to determine whether the combination represents a false alarm or a valid alarm, the false alarm predicting model being a local model to the location as per the parameters; and the learning module using the determination as to whether the combination represents the false alarm or the valid alarm to update the false alarm predicting model for increased accuracy at future times.

2. The method of claim 1 further comprising:

the learning module receiving the alarm signal from the security system that protects a geographic area associated with the location, wherein the additional information further includes movement data associated with the geographic area during the time associated with the alarm signal or incident reports relevant to the geographic area.

3. The method of claim 1 further comprising:

the learning module receiving feedback signals indicating whether the combination represents the false alarm or the valid alarm; and the learning module using the feedback signals in addition to the determination as to whether the combination represents the false alarm or the valid alarm to update the false alarm predicting model for increased accuracy at future times.

4. The method of claim 1 further comprising:

the learning module parsing a plurality of alarm signals from a historical time period, a plurality of additional information from the historical time period, first feedback signals indicative of a plurality of false alarms from the historical time period, and second feedback signals indicative of a plurality of valid alarms from the historical time period to build the false alarm predicting model.

5. The method of claim 4 wherein the plurality of alarm signals originate from a plurality of security systems that protect a plurality of geographic areas, and wherein the plurality of additional information includes weather data from a time associated with one of the plurality of alarm signals, movement data associated with one of the plurality of geographic areas during the time associated with the one of the plurality of alarm signals, a location of users of one of the plurality of security systems during the time associated with the one of the plurality of alarm signals, or incident reports relevant to one of the plurality of geographic areas.

6. The method of claim 4 further comprising:

the learning module building the false alarm predicting model by recognizing first patterns of the plurality of alarm signals and the plurality of additional information that result in the first feedback signals and recognizing second patterns of the plurality of alarm signals and the plurality of additional information that result in the second feedback signals; and the learning module comparing the combination to the first patterns and the second patterns to determine whether the combination represents the false alarm or the valid alarm.

7. The method of claim 4 further comprising:

the learning module identifying a score to determine whether the combination represents the false alarm or the valid alarm, wherein the score is indicative of a likelihood that the combination represents the false alarm or the valid alarm, and wherein the score is a based on an amount by which the alarm signal and the additional information match the plurality of alarm signals and the plurality of additional information.

8. The method of claim 7 further comprising:

transmitting the score to an automated dispatcher module;

the automated dispatcher module comparing the score to a threshold value to automatically determine whether to alert the user or relevant authorities about the alarm signal; and when the score indicates that the automated dispatcher module should alert the relevant authorities about the alarm signal, the automated dispatcher module inserting a notification signal indicative of the alarm signal and demographic data associated with the alarm signal directly into a dispatch system for the relevant authorities.

9. The method of claim 1 further comprising:

the learning module making a binary determination as to whether the combination represents the false alarm or the valid alarm; and when the binary determination indicates that the combination represents the valid alarm, an automated dispatcher module inserting a notification signal indicative of the alarm signal and demographic data associated with the alarm signal directly into a dispatch system for relevant authorities.

10. The method of claim 1 further comprising:

the learning module receiving the alarm signal from a security system that protects a geographic area;

the learning module transmitting an identification of the security system to an automated dispatcher module with a status signal;

responsive to receiving the status signal, the automated dispatcher module identifying and executing a customized response protocol associated with the security system; and the automated dispatcher module determining whether a response to executing the customized response protocol is indicative of the false alarm or the valid alarm to automatically determine whether to alert authorities about the alarm signal.

11. A system comprising:

a learning module; and a security system that protects a geographic area, the learning module in communication with the security system, wherein the learning module receives an alarm signal and additional information associated with the alarm signal, the alarm signal and additional information being received in accordance with parameters that filter a type and quantity of the additional information, the learning model further uses a false alarm predicting model associated with the geographic area to process a combination of the alarm signal and the additional information to determine whether the combination represents a false alarm or a valid alarm, and uses the determination as to whether the combination represents the false alarm or the valid alarm to update the false alarm predicting model for increased accuracy at future times, wherein the additional information includes each of weather data from a time associated with the alarm signal and a location of one or more users of a security system, from which the alarm signal is received, during the time associated with the alarm signal, and wherein, when the learning module determines that the combination represents the valid alarm, the learning module generates a notification signal indicative of the alarm signal and demographic data associated with the additional information.

12. The system of claim 11 wherein the learning module receives the alarm signal from the security system that protects the geographic area, and wherein the additional information further includes movement data associated with the geographic area during the time associated with the alarm signal or incident reports relevant to the geographic area.

13. The system of claim 11 wherein the learning module receives feedback signals indicating whether the combination represents the false alarm or the valid alarm and uses the feedback signals to update the false alarm predicting model for increased accuracy at future times.

14. The system of claim 11 wherein the learning module parses a plurality of alarm signals from a historical time period, a plurality of additional information from the historical time period, first feedback signals indicative of a plurality of false alarms from the historical time period, and second feedback signals indicative of a plurality of valid alarms from the historical time period to build the false alarm predicting model.

15. The system of claim 14 wherein the plurality of alarm signals originate from a plurality of security systems that protect a plurality of geographic areas, and wherein the plurality of additional information includes weather data from a time associated with one of the plurality of alarm signals, movement data associated with one of the plurality of geographic areas during the time associated with the one of the plurality of alarm signals, a location of users of one of the plurality of security systems during the time associated with the one of the plurality of alarm signals, or incident reports relevant to one of the plurality of geographic areas.

16. The system of claim 14 wherein the learning module builds the false alarm predicting model by recognizing first patterns of the plurality of alarm signals and the plurality of additional information that result in the first feedback signals and recognizing second patterns of the plurality of alarm signals and the plurality of additional information that result in the second feedback signals, and wherein the learning module compares the combination to the first patterns and the second patterns to determine whether the combination represents the false alarm or the valid alarm.

17. The system of claim 14 wherein the learning module identifies a score to determine whether the combination represents the false alarm or the valid alarm, wherein the score is indicative of a likelihood that the combination represents the false alarm or the valid alarm, and wherein the score is a based on an amount by which the alarm signal and the additional information match the plurality of alarm signals and the plurality of additional information.

18. The system of claim 17 wherein the learning module transmits the score to an automated dispatcher module, and wherein the automated dispatcher module compares the score to a threshold value to automatically determine whether to alert the user or relevant authorities about the alarm signal and, when the score indicates that the automated dispatcher module should alert the relevant authorities about the alarm signal, inserts a notification signal indicative of the alarm signal and demographic data associated with the additional information directly into a dispatch system for relevant authorities.

19. The system of claim 11 wherein the learning module makes a binary determination as to whether the combination represents the false alarm or the valid alarm, and wherein, when the binary determination indicates that the combination represents the valid alarm, the learning module generates the notification signal indicative of the alarm signal and demographic data associated with the additional information.

20. The system of claim 11 wherein the learning module receives the alarm signal from the security system that protects the geographic area and transmits an identification of the security system to an automated dispatcher module with a status signal, and wherein, responsive to receiving the status signal, the automated dispatcher module identifies and executes a customized response protocol associated with the security system and determines whether a response to executing the customized response protocol is indicative of the false alarm or the valid alarm to automatically determine whether to alert authorities about the alarm signal.

* * * * *